Sept. 30, 1941.   D. H. JOHANNESEN   2,257,119
DUST GUARD
Filed Aug. 23, 1937
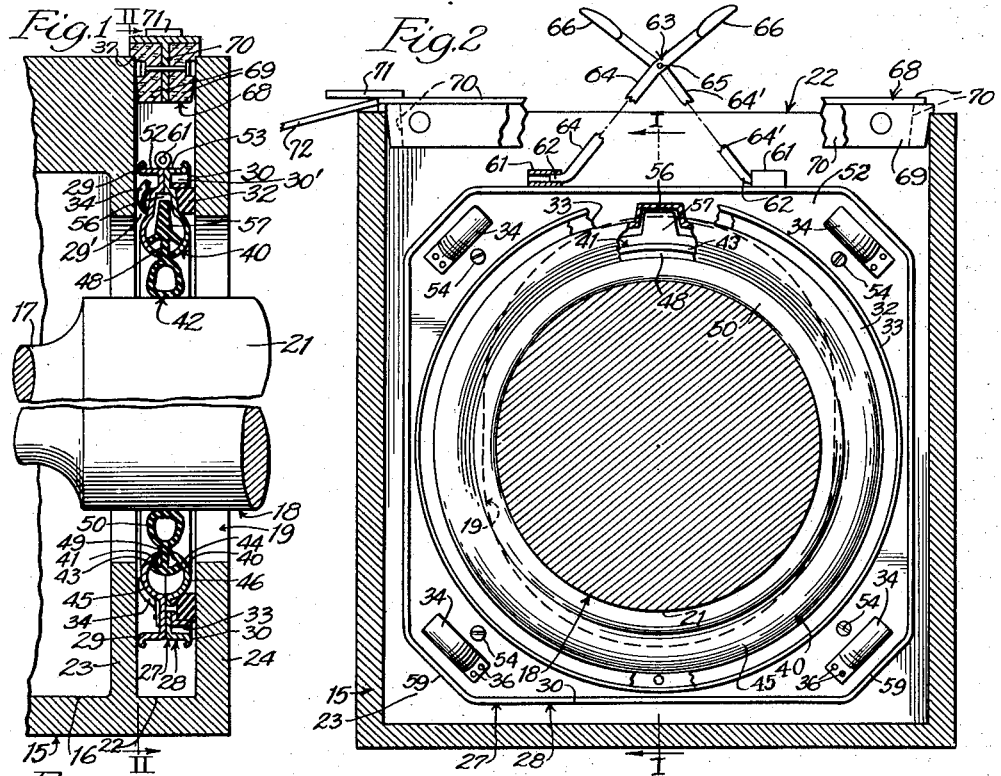
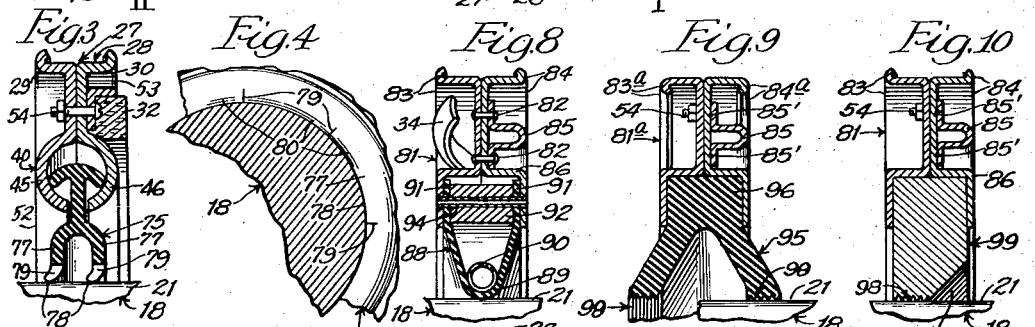
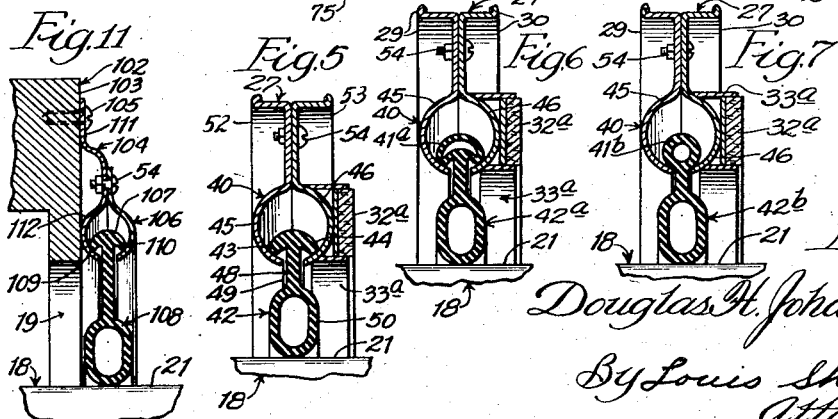
Inventor:
Douglas H. Johannesen,
By Louis Sheldon
Attorney.

Patented Sept. 30, 1941

2,257,119

UNITED STATES PATENT OFFICE 2,257,119

DUST GUARD

Douglas H. Johannesen, Chicago, Ill.

Application August 23, 1937, Serial No. 160,400

10 Claims. (Cl. 286—6)

This invention relates to railway vehicle and other journal boxes, and more particularly to oil and dust guards therefor.

It is an object of my invention to provide a unitary combined oil and dust guard device for a journal box.

It is another object to provide a dust guard which will adapt itself automatically to axles of different diameters.

It is also an object to provide a resilient seal device which will adapt itself to axle seats of different diameters.

A further object resides in the provision of a device of this character adapted to be inserted readily and easily into and similarly removed from a journal box dust guard pocket.

Another object is the provision of a sealing unit affording ready replacement of the sealing element thereof.

A further object is the provision of a sealing element of resilient soft oil- and wear-resistant material.

It is another object to provide a dust guard pocket closure which may be firmly seated and readily unseated.

Other objects are to provide a device of the character referred to: in which a single element functions both as an oil seal and a dust seal; in which the guard has minimum contact with the walls of the dust guard pocket and is easily removable from the pocket irrespective of weather conditions; in which a central sealing element is adapted to be supported in spaced relation to the dust guard pocket walls; and which is adapted to float freely in the pocket.

It is also an object to provide simple and efficient dust guard removing means.

Further objects and advantages of my invention will appear as the description proceeds.

The invention will be understood more readily upon reference to the ensuing description and the accompanying drawing, in which:

Fig. 1 is a longitudinal broken cross-sectional view of a journal box and axle assembly including one form of dust guard embodying my invention, taken as indicated by the line I—I in Fig. 2.

Fig. 2 is a transverse sectional view taken as indicated by the line II—II in Fig. 1, showing also a guard-removing tool embodying a feature of my invention.

Fig. 3 is an enlarged fragmentary sectional view of another form of dust guard constructed in accordance with my invention.

Fig. 4 is a fragmentary reduced elevational view of the inner sealing element appearing in Fig. 3.

Figs. 5 to 11 are views similar to Fig. 3, but of seven additional forms of my invention.

Referring now more particularly to the drawing, a journal box is shown fragmentarily at 15 with its oil cellar 16 receiving an end 17 of an axle 18, and with an end open at 19 and receiving the dust guard seat 21 of the axle. The box has at said end a dust guard cavity or pocket 22 which divides the opening 19, said pocket having inner and outer walls 23 and 24, respectively. A dust guard construction embodying features of my invention is adapted to cooperate with the axle seat 21 and the walls of said pocket to effectively prevent escape of oil and infiltration of dust and other foreign matter.

A dust guard constructed in accordance with one form of the invention is shown in Figs. 1 and 2, and comprises a sheet metal or other casing or body 27 of generally annular form and of an axial width which may be slightly less than the distance between the pocket walls 23 and 24. The body 27 has a rim or flange 28 providing inner and outer planar edges 29 and 30 adapted respectively to engage said walls. Radially inward of these edge portions the body affords recesses 29' and 30' adapted to receive and trap any particles slipping by these edges toward the axle. In prior constructions, where wide surface engagement between the pocket walls and the dust guard has been the rule, such particles lodge between such surfaces and seriously interfere with sealing, cause undue wear and more easily gain access to the oil in the journal box.

A generally annular molded rubber, cork or other sealing element such as the gasket 32 is bonded or otherwise secured to a backing member 33 riveted or welded or otherwise suitably secured to the body 27 so as normally to project laterally beyond the outer flange edge 30 and engage the outer wall 24 of the dust guard pocket. The overall axial dimension of the dust guard is slightly less than the width of the pocket to provide adequate clearance for insertion and removal of the dust guard. The margins of the flanges may be formed as desired, but preferably present curved smooth edges 29 and 30 which, for ease in stamping, are turned out as shown.

Secured to the body 27 so as to project laterally beyond the inner flange edge 29 are metal or other springs 34, each preferably providing a curved bearing surface of spherical or other suitable shape to afford substantially a point contact with the inner wall 23 of the dust guard pocket. These springs may extend at any suitable angles, and may be in the form of cantilever leaves anchored by spot welding, riveting or otherwise, as at 36. The bearing surface enables each spring to be depressed readily into the pocket by the top edge 37 of the inner wall 23 of the pocket, thereby eliminating the need of a special tool for depressing the springs, such tools being necessary when ordinary types of spring are employed.

The springs 34 press against the inner wall 23 and thereby press the gasket 32 against the outer wall 24. The surface of the wall 24 so engaged is usually a casting surface, i. e., not very smooth, but the crests and valleys thereof are sealed by the gasket 32 due to its softness and resilience, when pressed by the springs.

The body 27 provides at its inner periphery a preferably circular cross-sectionally C-shaped channel portion 40 in which is anchored the rim 41 of an annular resilient element such as the gasket 42. This element may be substantially centrally disposed, if desired. The inner and outer edges, respectively, of the rim 41 are under pressure and in substantially dovetailed sealing engagement circumferentially throughout with the respective inner and outer channel walls 45 and 46. The gasket 42 has a web 48 projecting radially inwardly from said rim 41 through the annular throat or slot 49 of the channel portion 40, and this web is joined to a sealing gasket member of any suitable form, such as the tube or tire 50, dimensioned to have complete sealing engagement under light pressure with the axle dust guard seat 21.

Dust guard seats on railway axles of a given nominal size vary in practice plus or minus about ⅛". The axle seat engaging part 50 is formed to sealingly engage the different sizes within the range indicated, encountered in practice. To that end, the member 42, or at least the part 50, is formed of material of such character from the standpoint of resilience that it will grip the largest seat with not too great a pressure and the smallest seat with not too light a pressure, and therefore will be long lived and efficient.

The body 27 may be formed in any suitable way, preferably by taking two parts such as the complemental parts 52 and 53, placing them with the channel-forming walls 45 and 46 thereof straddling the unstressed rim 41 of the sealing element 42, and then securing the parts 52 and 53 together. The parts may be integrally united as by spot welding, riveting or otherwise, but may also be separably connected as by any suitable number of bolt means 54 so that said parts may be disconnected and reconnected for ready replacement of a sealing element. The bolt means may be equipped with suitable lock washers if desired. The rim 41 of the sealing element 42 is normally wider than the space between the portions of the channel walls 45 and 46 engaged thereby, so that when the parts 52 and 53 are properly assembled the rim 41 is squeezed between said walls to form the desired seals.

The parts 52 and 53 provide together at the web of the guard body 27 a recess or keyway 56, and the sealing element 42 has at the rim 41 thereof a lug or key 57 formed to fit in said keyway to prevent relative rotation of said body and element.

The dust guard may be generally rectangular or otherwise formed to fit non-rotatably in the pocket 22, and its corners may be tapered as at 59 to facilitate insertion of the dust guard into the pocket.

A pair of eyes 61 suitably secured to the top of the dust guard are adapted to receive the prongs 62 of a dust guard extraction tool 63 which may comprise a pair of levers 64 and 64' hinged together as at 65, with handles 66 adapted to be disposed clear of the pocket 22 when the guard is fully disposed in the pocket. The tool is convenient for lowering the guard into the pocket and for holding the guard in a position to enable it to be slipped about the axle as the journal box is brought into its proper position.

The top of the pocket is sealed by an elongated stopper 68 having a preferably tapered cork or other suitable yieldable gasket material 69 which may be united with a T-bar 70 or other suitable reinforcing means. Welded or otherwise suitably secured to and projecting from the reinforcing member 70 is a lug 71 between which and the journal box a prying or other extraction tool as indicated at 72 is adapted to be applied to readily remove the stopper.

With the described sealing structure assembled, it will be observed that the radially inner periphery of the sealing element 42, the sealing rim edges 43 and 44, the stopper 68, the lateral gasket 32 and the guard flange edges 29 and 30 serve both as oil seals and as dust seals.

The gasket rim edge 44 serves to stop any oil escaping past the gasket rim edge 43, and the edge 43 serves to stop any dust filtering past the gasket edge 44.

The various seals afforded by this invention accordingly render the construction fully effective as an oil seal and as a dust guard. The unit has minimum contact with the outer wall of the dust guard pocket so as to provide minimum resistance to its movement relative to the journal box so that the unit is adapted to float freely in the pocket. Substantially the only wear on the axle-embracing gasket 42 occurs at the seat 21 of the axle.

In the form of my invention appearing in Figs. 3 and 4, the central sealing element 75, instead of being tubular at its inner portion, is cross-sectionally substantially U-shaped, providing arms 77 whose free edges 78 are arranged to bear on the axle seat 21. Each edge 78 has a circumferential series of cuts or kerfs 79 which enable said edges to be flexed more readily to accommodate axle seats of different diameters as explained above, the arcuate segments 80 thus formed being at all times interengaged at the cuts so as to preclude passage of oil and dust therethrough.

The form of the invention appearing in Fig. 5 differs from that of Fig. 1 essentially in that, in Fig. 5, the lateral gasket 32a, of cork, composition or other suitable material, is secured in a metallic or other socket or backing member 33a welded or otherwise suitably secured to the body 27, as at the outer side 46 of the channel portion 40, which retains the axle gasket 42.

Fig. 6 is like Fig. 5 except that the former shows an axle gasket 42a which differs from the gasket 42 in that the rim 41a is tubular as well as somewhat flat.

The axle gasket 42b of Fig. 7 differs from that of Fig. 6 in that its tubular rim 41b is of substantially round cross-section and is adapted to cooperate substantially with the edges of the retaining-channel walls 45 and 46 to provide the sealing engagements.

In the form appearing in Fig. 8 is shown a modified dust guard body 81, formed of parts joined as by rivets, as shown at 82, welding or otherwise. This body has inner and outer pocket wall engaging edges 83 and 84 and is provided with a metal or other relatively stiff generally annular ridge 85 which may be coplanar, at its crest, with the edge 84 as shown or, if desired, like the corresponding gasket 32 of Fig. 1, may project beyond said edge. As shown in Fig. 8, both the ridge 85 and the edge 84 are engageable with the outer wall 24 of the dust guard pocket at the same time to function as oil and dust foils or gaskets. The inner gasket-retaining channel 86 may be U-shaped as shown. A membranous or other preferably thin gasket sheet 88 of resilient soft oil-resistant rubber or other material is molded or otherwise formed into an annulus generally V-shaped in cross-section with its apex 89 innermost. Fitted within the apex is a circular prefarably coiled spring 90 to cause the apex to engage axle seats of different diameters with a light pressure. Between the flanges 91 of the gasket member 88 is an annular block 92 of wood or other suitable material, and these are fitted in the channel 86 before the channel-forming parts are joined. Hollow rivets 94 or other suitable means join the block 92 and flanges 91 to the walls of the channel 86.

In Fig. 9 a further modified axle gasket 95 is shown. This gasket may be of resilient rubber and generally V-shaped in cross-section with its apex 96 outermost, said apex being preferably assembled with the dust guard body 81a as by placing the apex between the separated body parts or sections and fastening the sections together as by bolt means 54 so that they may be separated if desired, or by rivets or the like if a permanent connection is desired. The inwardly divergent arms are resiliently flexible toward each other to facilitate insertion and removal of the dust guard, and are formed with bearing surfaces 98 roughened as by circular grooves and intervening ridges. The edges on this and other forms of body may be turned as shown at 83a and 84a.

Fig. 10 illustrates a relatively non-resilient central sealing element of molded composition, Babbitt metal or other suitable bearing material, preferably in a continuous annular form, such as the axle gasket 99 which is assembled with the channel 86 of the body 81, as explained in connection with the form shown in Fig. 9. This gasket is accordingly made to have a close fit with a particular size axle seat to properly seal the same. The gasket is preferably flared at its outer side, as shown at 100, to guide the gasket onto the seat 21 from the axle end 17.

In Figs. 9 and 10 the ridge 85 is shown spot welded or otherwise welded at 85', although it may be secured otherwise, and the inner surface 98 of the central gasket in Fig. 10 may be like those of Fig. 9.

Fig. 11 shows at 102 another type of journal box, to whose end 103 a dust guard body 104 is secured at 105, said body providing a channel 106 receiving the rim 107 of a central sealing element 108 of any suitable construction. Seals are effective at the axle seat 21, the inner and outer edges 109 and 110 of the rim 107, the anchored flange 111 of the body and the inner wall 112 of the channel 106.

The outer flange edge of the dust guard body in Figs. 1 to 10 could serve as the sole lateral gasket at the outer side, or a gasket may be secured to or in place of said edge. The inner body flange edge could be on a separate member suitably assembled, with the spring means disposed to press both edges toward the walls of the dust guard pocket.

The central sealing element of Figs. 1 to 7, 9, 10 and 11 may turn relative to the supporting body, but is preferably provided with the lug or key 57 to prevent such turning.

The neck or web 48 in the central sealing element of Figs. 1 to 7 and 11 is freely slidable in the slot in the channel, so that said element may move in its own plane relative to the supporting body in response to the vibration or jogging of the axle, while said element remains in sealing engagement with the walls of the channel, so that rubbing of the body against the walls of the pocket is minimized.

It is to be understood that any type of body shown, with or without modification, as will be apparent to anyone skilled in the art, is adapted to cooperate with any type of axle gasket and pocket wall gasket illustrated. All non-metallic gaskets are of oil- and wear-resistant material, such as cork, composition, synthetic rubber and other substances.

I am aware that changes may be made through a wide range without departing from the principles of my invention, and I therefore do not purpose limiting the patent granted hereon otherwise than as necessitated by the prior art.

I claim:

1. A dust guard comprising a support having an annular portion, and a central sealing element having an annular portion, said portions being separably dovetailed together and in sealing interengagement.

2. In an assembly including a journal box having an opening and an axle having a dust guard seat in said opening, a unitary dust guard for said assembly, comprising a body having a lateral portion formed for sealing engagement with a lateral wall of said box about said seat, said body having an inwardly opening restricted channel, and a central sealing element comprising an annular oil- and wear-resistant gasket formed to intimately and sealingly embrace said seat and extending freely through said opening and having a transverse enlargement in said channel, said gasket being resiliently expansible and contractible at its inner periphery to accommodate axle seats of different diameters.

3. In an assembly including a journal box and an axle therein, a dust guard comprising a body formed for securement in sealing engagement with a wall of the box about the axle, said body having a restricted channel and a one-piece annular sealing element formed to embrace the axle and having an annular transversely enlarged anchoring formation clamped in securing engagement with the interior walls of said channel.

4. As an article of manufacture, a one-piece annular member comprising an inner soft radially resiliently expansible and contractible hollow axle-embracing part, an outer transversely enlarged, transversely compressible and expansible part, and a web integrally united to said parts.

5. As an article of manufacture, a dust sealing element comprising an annular one-piece member including a soft radially resiliently expansible and contractible axle-embracing part, a transversely enlarged, transversely compressible and expansible anchoring part, and a web integrally united to said parts.

6. As an article of manufacture, a one-piece dust sealing element comprising an annular soft radially resiliently expansible and contractible axle-embracing part and a connected outer hollow transversely enlarged, transversely expansible and contractible annular anchoring part.

7. A dust guard comprising a support having an annular inwardly restricted channel, a one-piece resilient rubber member having an outer transversely enlarged portion in and in sealing engagement with the sides of said channel and capable of radial movement in said channel while in said engagement, a web connected to said outer portion and extending freely inwardly through said channel opening, and a central axle-embracing portion connected to said web.

8. A dust guard comprising a support having an annular inwardly restricted channel, a one-piece resilient rubber member having an outer transversely enlarged portion in and in sealing engagement with the sides of said channel and capable of radial movement in said channel while in said engagement, a web connected to said outer portion and extending freely inwardly through said channel opening, and a central tubular axle-embracing portion connected to said web.

9. A dust guard comprising a support having an annular inwardly restricted channel, a one-piece resilient rubber member having an outer transversely enlarged portion in and in sealing engagement with the sides of said channel and capable of radial movement in said channel while in said engagement, a web connected to said outer portion and extending freely inwardly through said channel opening, a central axle-embracing portion connected to said web, and means associated with said channel and element for preventing relative rotation thereof.

10. A dust guard comprising a pair of complemental annular relatively rigid members separably connected together and forming an inwardly opening restricted channel, a one-piece resilient annular rubber member having an outer transversely enlarged portion in and in sealing engagement with the sides of said channel and capable of radial movement in said channel while in said engagement, a web connected to said outer portion and extending freely inwardly through said channel opening, and a central axle-embracing portion connected to said web, said enlarged portion being normally wider than the portions of the channel engaged thereby so as to be under compression.

DOUGLAS H. JOHANNESEN.